E. W. WEST.
LAWN RAKE AND SEED BRUSH.
APPLICATION FILED SEPT. 26, 1913.
1,115,881. Patented Nov. 3, 1914.
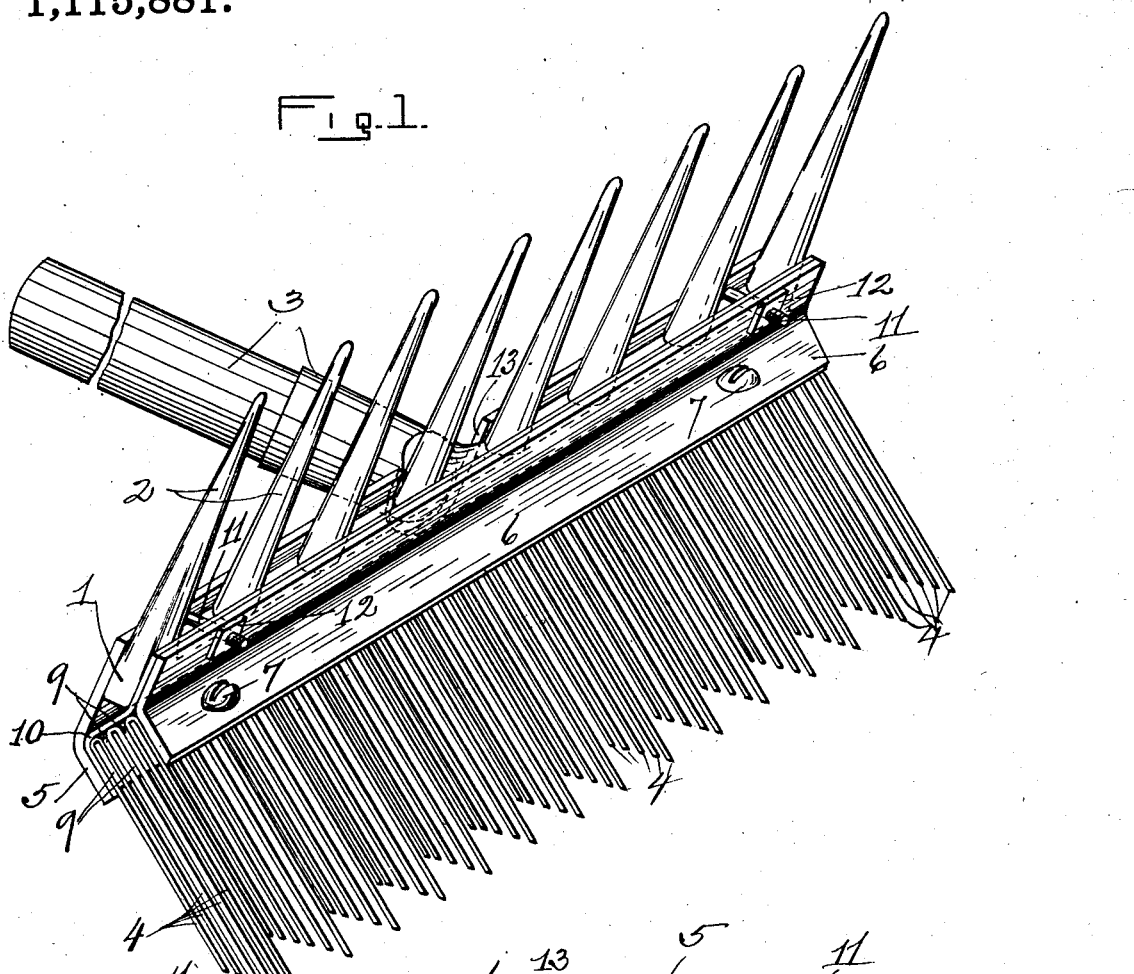
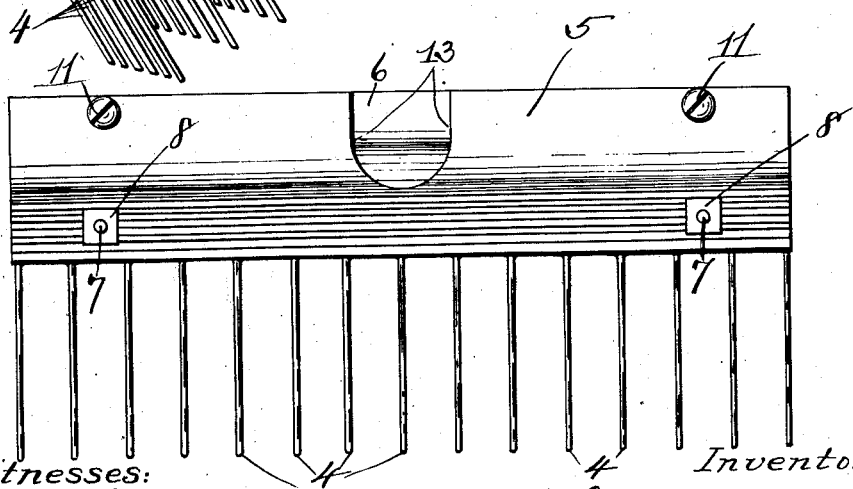
Witnesses:
Rose A. Leduc
Gertrude M. Pitz
Inventor:
Ernest Winton West,
By Frank E. Curtis,
Attorney

UNITED STATES PATENT OFFICE.

ERNEST WINTON WEST, OF GLOVERSVILLE, NEW YORK.

LAWN-RAKE AND SEED-BRUSH.

1,115,881.   Specification of Letters Patent.   Patented Nov. 3, 1914.

Application filed September 26, 1913. Serial No. 792,046.

*To all whom it may concern:*

Be it known that I, ERNEST WINTON WEST, a citizen of the United States, residing at Gloversville, county of Fulton, and State of New York, have invented certain new and useful Improvements in Lawn-Rakes and Seed-Brushes, of which the following is a specification.

The invention relates to such improvements and consists in the novel construction and combination of parts hereinafter described and subsequently claimed.

Reference may be had to the accompanying drawings, and the reference characters marked thereon, which form a part of this specification. Similar characters refer to similar parts in the several figures therein.

Figure 1 of the drawings is a view in perspective of my improved lawn-rake-and-seed-brush attached to the back of an ordinary rake. Fig. 2 is a view in front elevation of the lawn-rake-and-seed-brush detached.

The principal object of the invention is to provide a device particularly adapted for removing dead grass, leaves and other refuse from a lawn, and for brushing lawn-seed into the soil of the lawn.

Other objects will appear in connection with the following description.

Referring to the drawings wherein the invention is shown in preferred form, I have shown as a suitable support for my improved device, an ordinary garden-rake comprising a head, 1, teeth, 2, and handle, 3.

In using such a rake as a support and handle for my improved device, I invert the rake so that its teeth project upward as shown in Fig. 1.

My improved lawn-rake-and-seed-brush comprises a series of parallel rows of yielding resilient teeth or wires, each row comprising a plurality or series of teeth with the spaces between the neighboring rows unobstructed.

As shown in the drawings, each row of teeth comprises six teeth, 4, formed in pairs by bending pieces of spring-wire to hairpin or staple-form. The wires so bent are clamped between a front-plate, 5, and a back-plate, 6, by means of screws, 7, and nuts, 8, with suitable spacing-blocks, 9, separating the neighboring wires from front to rear. A cover-plate, 10, also held in position by the screws, 7, extends over the loops or bends in the wires preventing upward movement of the wires or teeth.

The front and back plates, 5 and 6, are angular in cross-section, their upwardly extending ends being adapted to embrace between them the head, 1, of an ordinary garden-rake upon which the device can be clamped by means of screw-bolts, 11, and nuts, 12. The back-plate, 6, is notched or recessed at 13, to receive the handle, 3, of the garden-rake.

The teeth, 4, in each row vary somewhat in length in regular order from front to rear, so that when the device is in use with the rake-handle, 3, held in convenient position, the teeth project obliquely rearward with their points all simultaneously engaging the ground.

In use the device is drawn along the lawn by means of the handle, 3, for which operation very little force is required, due to the arrangement of the wire-teeth in parallel rows with unobstructed spaces between the neighboring rows of teeth.

By drawing the device over the lawn, it serves as a rake to remove grass-cuttings, whether new or old, leaves and other refuse; and when used after sprinkling the lawn with seed, it serves as a brush to rub the seed into the soil.

The variation in the length of the teeth in each row causes somewhat of a variation in the yielding qualities of the teeth.

What I claim as new and desire to secure by Letters Patent is—

1. A device of the class described comprising a support, and numerous flexible resilient wire teeth, all substantially straight and parallel, mounted upon said support, said teeth being arranged in a series of rows extending directly from front to rear with unobstructed spaces between the neighboring rows, each row containing a series of teeth spaced apart to permit independent rearward movement of the teeth.

2. A device of the class described comprising a support and numerous flexible resilient wire teeth extending all substantially parallel obliquely rearward from said support, said teeth being arranged in a series of rows extending from front to rear with unobstructed spaces between the neighboring rows, each row containing a plurality of teeth successively longer from front to rear.

3. A device of the class described comprising a support having flanges adapted to receive the head of an ordinary garden-rake, and having means whereby it is adapted to be clamped thereupon; and numerous flexible resilient wire teeth projecting all substantially parallel obliquely rearward from said support, said teeth being arranged in a series of rows extending from front to rear with a plurality of teeth in the several rows.

4. A device of the class described comprising a pair of plates having flanges adapted to receive the head of an ordinary garden-rake, and numerous flexible resilient teeth having their inner ends clamped between said plates, said teeth being arranged in a series of rows extending from front to rear with a plurality of teeth in the several rows.

In testimony whereof, I have hereunto set my hand this 24 day of September, 1913.

ERNEST WINTON WEST.

Witnesses:
    O. L. EVEREST,
    MARTIN F. MURPHY.